(12) United States Patent
Watanabe et al.

(10) Patent No.: US 7,020,440 B2
(45) Date of Patent: Mar. 28, 2006

(54) METHOD AND APPARATUS FOR AN SIP BASED PAGING SCHEME

(75) Inventors: Fujio Watanabe, Sunnyvale, CA (US); Gang Wu, Cupertino, CA (US)

(73) Assignee: NTT DoCoMo, Inc., Tokyo (JP)

( * ) Notice: Subject to any disclaimer, the term of this patent is extended or adjusted under 35 U.S.C. 154(b) by 361 days.

(21) Appl. No.: 10/318,803

(22) Filed: Dec. 13, 2002

(65) Prior Publication Data
US 2004/0203894 A1 Oct. 14, 2004

(51) Int. Cl.
*H04Q 7/20* (2006.01)

(52) U.S. Cl. ............... 455/67.1; 455/423; 455/414; 455/42; 455/458; 455/456.1; 370/395.52; 370/331; 370/338; 370/401; 370/469

(58) Field of Classification Search ............... 455/67.1, 455/423, 414, 422, 458, 456.1, 42; 370/395.52, 370/331, 338, 401, 469, 465
See application file for complete search history.

(56) References Cited

U.S. PATENT DOCUMENTS

| | | | |
|---|---|---|---|
| 2002/0126701 A1* | 9/2002 | Requena | 370/469 |
| 2003/0040280 A1* | 2/2003 | Koskelainen | 455/67.1 |
| 2003/0050051 A1* | 3/2003 | Vilander | 455/414 |
| 2005/0037781 A1* | 2/2005 | Ozuger et al. | 455/458 |

OTHER PUBLICATIONS

M. Handley et al., "SIP: Session Initiation Protocol," available at http://www.ietf.org/rfc/rfc2543.txt?number=2543 prior to Dec. 13, 2002, published by the Internet Society, 1999, pp. 1-153.

"Information technology—Telecommunications and information exchange between systems—Local and metropolitan area networks—Specific requirements—Part 11: Wireless LAN Medium Access Control (MAC) and Physical Layer (PHY) Specifications," published by IEEE, ANSI/IEEE Std 802.11, published 1999, pp. 1-513.

J. Kempf, "Dormant Mode Host Alerting ("IP Paging") Problem Statement," available at http://www.ietf.org/rfc/rfc3132.txt prior to Dec. 13, 2002, published by the Internet Society, 2001, pp. 1-24.

C. Perkins, "IP Mobility Report," available at http://www.ietf.org/rfc/rfc2002.txt prior to Dec. 13, 2002, pp. 1-48.

(Continued)

*Primary Examiner*—Temica Beamer
*Assistant Examiner*—Julio Perez
(74) *Attorney, Agent, or Firm*—Edward C. Kwok; MacPherson Kwok Chen & Heid LLP

(57) ABSTRACT

A location update system for updating a location of a mobile terminal. The system includes a paging area with a mobile terminal present within the paging area, a domain area with the mobile terminal present within the domain area and a paging location update server that is communication with the mobile terminal and updates a location of the mobile terminal and updates the domain area.

20 Claims, 5 Drawing Sheets

OTHER PUBLICATIONS

Cisco Systems literature, "Overview of the Session Initiation Protocol," available at http://www.cisco.com/univercd/cc/td/doc/product/voice/sipsols/biggulp/bgsipov.htm prior to Dec. 13, 2002, pp. 1-1 to 1-8.

* cited by examiner

METHOD AND APPARATUS FOR AN SIP BASED PAGING SCHEME

BACKGROUND OF THE INVENTION

1. Field of the Invention

The present invention relates to the field of wireless networks.

2. Discussion of Related Art

It is well known that in a mobile communication system, the mobile terminal needs to update its location to the network. More specifically, in order to conserve signaling between the network and the mobile terminal and to reduce power drain on the mobile terminal, the mobile terminal only updates the network about its location when it crosses a paging area boundary, which is far less frequent than when it crosses a communication area (covered by a base station or radio access point) boundary.

There have been several methods proposed and studied recently to solve the paging problem in an IP-based wireless network. One proposal is described in the IP paging document located at http://www.ietf.org/rfc/rfc3132.txt. The proposal regards whether Mobile IP can support location of a mobile terminal in a dormant mode for two cases: 1) networks of radio links having a homogeneous radio technology and 2) networks of radio links having heterogeneous radio technologies. The proposal states that the signaling involved in Mobile IP is not enough to provide support for locating a dormant mode mobile terminal, especially when the one paging area includes several subnets. Since the mobile terminal does not stop in one subnet (say the subnet X) where a binding update message of Mobile IP was transmitted, the mobile terminal in the dormant mode may move into a new subnet (say the subnet Y) where the IP address is supposed to be changed. Therefore, without any support, the access router or foreign agent in the subnet X drops the packet which is destined to the mobile terminal. The only way to get the packet to the mobile terminal from the access router or foreign agent is for the mobile terminal to send the binding update message of Mobile IP to the access router or foreign agent when the mobile terminal wakes up in the new subnet Y.

Note that subnets constitute the unit of signaling for presence in Mobile IP. When a mobile node moves from one subnet to another, Mobile IP signaling is required to change the mobile terminal's care-of address (CoA). This signaling establishes the mobile terminal's presence in the new subnet. In contrast, paging areas constitute the unit of signaling for a dormant mode mobile terminal presence at the radio level. Paging area registrations or heuristics are used to establish a dormant mode mobile terminal's presence in a particular paging area.

In current mobile communication systems, the issue of finding a mobile terminal is treated as follows. The network keeps track of the location of every attached mobile terminal with the accuracy of a geographical location area (LA) that is the same as the paging area. For example, in 3GPP packet switching network, the home location register will track the mobile terminal based on the current attached SGSN (serving GPRS support node). A location update in the database takes place whenever an attached mobile terminal crosses the boundaries of a location area. Whenever an incoming call arrives, the network has to locate the called mobile terminal within the precision of a cell, i.e., to determine the base station via which a wireless signaling link between the mobile terminal and the network can be established. During paging, a specific message is broadcast simultaneously via all base stations over the whole location area so as to find out the called mobile terminal. Upon receiving the paging request, the mobile terminal responds to the base station with the stronger received signal strength. So, in this case, the paging area is equal to the location area.

In general, the mapping between paging areas and subnets can be arbitrary, but for the purpose of discussion will be considered initially to have a smooth subset relationship, in which paging areas are subsets of subnets or vice versa. As described above, the problem is that the mobile terminal when in the dormant mode does not wake up when crossing between subnets within a paging area and will not send the binding update message of Mobile IP. Since the IP paging was not solved by the process described in the document, the process was not explored further in the document.

Due to the router maximum capability, the subnet size is limited so that one paging area may include several subnets. When the dormant mode mobile terminal crosses the paging area boundary, the dormant mode mobile terminal will not send the binding update message of Mobile IP. Therefore, the router will not know the exact location of the dormant mode mobile terminal. Consequently, the location detection for the dormant mode mobile terminal is fully dependant on the L2 paging scheme.

A paging scheme is important for receiving the phone call. Because of a battery saving mode in a mobile communications system, the mobile terminal will go to the sleeping or dormant mode most of time. Once a call has arrived, a mobile terminal is paged through the paging channel.

SUMMARY OF THE INVENTION

One aspect of the present invention regards a method of paging a mobile terminal that includes providing a mobile terminal in a paging area and in a location area associated with an application layer and moving the mobile terminal to a location that is outside the paging area and the location area. In response to the moving, sending a single message to a paging location update server that updates the location of the mobile terminal and a domain area associated with the application.

A second aspect of the present invention regards a method of paging a mobile terminal that includes sending a signal from a mobile terminal to a paging location update server and identifying a location of a L2 paging area from which the signal was sent from the mobile terminal. Determining whether the paging area is the same as a current associated paging area to which the mobile terminal is currently being associated or connected and sending a current location update and a current SIP domain address of the mobile terminal to the paging location update server. Determining if an SIP domain address is the same as the current SIP domain address of the mobile terminal and sending a new SIP location of the mobile terminal to a current SIP location server where the mobile terminal is located when the SIP domain address is different than the current SIP domain address of the mobile terminal.

A third aspect of the present invention regards a location update system for updating a location of a mobile terminal. The system includes a paging area with a mobile terminal present within the paging area, a domain area with the mobile terminal present within the domain area and a paging location update server that is in communication with the mobile terminal and updates a location of the mobile terminal and the domain area.

Each of the above aspects of the present invention provides the advantage of reducing duplication of location information.

Each of the above aspects of the present invention provides the advantage of allowing location information to be determined for a mobile terminal in a dormant mode.

The present invention, together with attendant objects and advantages, will be best understood with reference to the detailed description below in connection with the attached drawings.

DETAILED DESCRIPTION OF THE INVENTION

Figure 1:
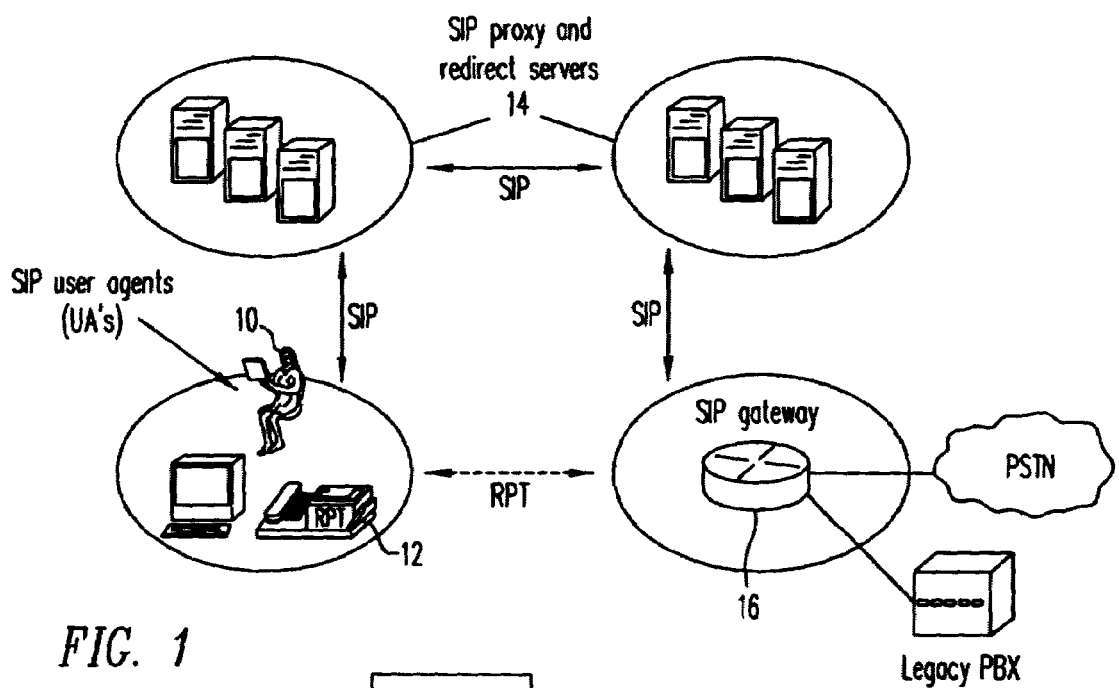
FIG. 1 schematically illustrates a known general SIP architecture.

The present invention is based on a higher layer protocol than the L2 layer used in the paging scheme described previously. In particular, the present invention takes advantage of various attributes of the higher layer protocol Session Initiation Protocol (SIP), which is not related to the IP subnets and is standardized in the Internet Engineering Task Force's (IETF's) for multimedia conferencing over IP. An example of a general SIP architecture is shown in FIG. 1. As shown in FIG. 1, a user agent 10 sends a signal via a phone 12 or the like to a target mobile terminal via proxy and redirect servers 14. Control of the call is provided by a gateway 16 that is also in contact with the servers 14. A real time protocol (RTP) is used to carry a real time packet of information, e.g., voice, between the gateway 16 and the SIP user agent 10. In addition, public telephone networks (PSTN) and/or private telephone networks (PBX) are in communication with the gateway 16.

In order to fully understand Applicants' invention, a summary of the attributes of SIP is given below.

The SIP layer is based on the SIP domain, which is not related to IP addresses. Therefore, an SIP domain is larger than a subnet and it depends on the capability of handling the signaling or control traffic, such as set-up traffic, rather than that of managing the communication traffic related to data, so that an SIP domain is usually larger than an L2 paging area.

As defined in the document located at http://www.ietf.org/rfc/rfc2543.txt?number=2543, SIP is an ASCII-based, application-layer control protocol that can be used to establish, maintain, and terminate calls between two or more end points. Like other signaling protocols supporting VoIP (Voice over IP), SIP is designed to address the functions of signaling and session management within a packet telephony network. Signaling allows call information to be carried across network boundaries. Session management provides the ability to control the attributes of an end-to-end call.

According to the documents located at http://www.ietf.org/rfc/rfc2543.txt?number=2543 and http://www.cisco.com/univercd/cc/td/doc/product/voice/sipsols/biggulp/bg-sipov.htm, SIP provides the capabilities to:

1) Determine the location of the target end point (target mobile terminal)—SIP supports address resolution, name mapping, and call redirection.

2) Determine the media capabilities of the target end point—via Session Description Protocol (SDP), SIP determines the "lowest level" of common services between the end points. Conferences are established using only the media capabilities that can be supported by all end points.

3) Determine the availability of the target end point—If a call cannot be completed because the target end point is unavailable, SIP determines whether the called party is already on the phone or did not answer in the allotted number of rings. It then returns a message indicating why the target end point was unavailable.

4) Establish a session between the originating and target end point—If the call can be completed, SIP establishes a session between the end points. SIP also supports mid-call changes, such as the addition of another end point to the conference or the changing of a media characteristic or codec.

5) Handle the transfer and termination of calls—SIP supports the transfer of calls from one end point to another. During a call transfer, SIP simply establishes a session between the transferee and a new end point (specified by the transferring party) and terminates the session between the transferee and the transferring party. At the end of a call, SIP terminates the sessions between all parties.

In SIP protocol, the peers in a session are called User Agents (UAs). A user agent has the following functions:

1) User agent client (UAC)—A client application that initiates the SIP request.

2) User agent server (UAS)—A server application that contacts the user when an SIP request is received and that returns a response on behalf of the user.

SIP clients include:

1) Phones—can act as either a UAS or UAC. SIP IP phones can initiate SIP requests and respond to requests.

2) Gateways—provide call control. Gateways provide many services, the most common being a translation function between SIP conferencing endpoints and other terminal types. This function includes translation between transmission formats and between communications procedures. In addition, the gateway translates between audio and video codecs and performs call setup and clearing on both the LAN side and the switched-circuit network side.

SIP servers include:

Proxy server—The proxy server is an intermediate device that receives SIP requests from a client and then forwards the requests on the client's behalf. Basically, proxy servers receive SIP messages and forward them to the next SIP server in the network. Proxy servers can provide functions such as authentication, authorization, network access control, routing, reliable request retransmission, and security.

Redirect server—Provides the client with information about the next hop or hops that a message should take and then the client contacts the next hop server or UAS directly.

Registrar server—Processes requests from UACs for registration of their current location. Registrar servers are often co-located with a redirect or proxy server.

As stated above, SIP also has a location server which stores the location information of the mobile terminal. This means whenever the mobile terminal moves to another place, the mobile terminal has to register its location with the location server. The location update in the L2 paging scheme described previously may not be as same as the SIP location registration. Therefore, the location update is duplicated in the L2 and SIP protocols because each protocol determines the location information for different purposes (L2 paging location and SIP location registration). In order to eliminate this duplication, the present invention reduces two different location updates to one location update. This scheme effectively works when the mobile terminal is in the dormant mode.

In addition, in the current variation of access networks, the paging scheme is dependent on each access network, so that there is no single paging scheme under a heterogeneous access network environment. Since the paging scheme is working independently in each access network, another aspect of the present invention regards an application level paging, called SIP based paging, under the heterogeneous access network.

Figure 2:
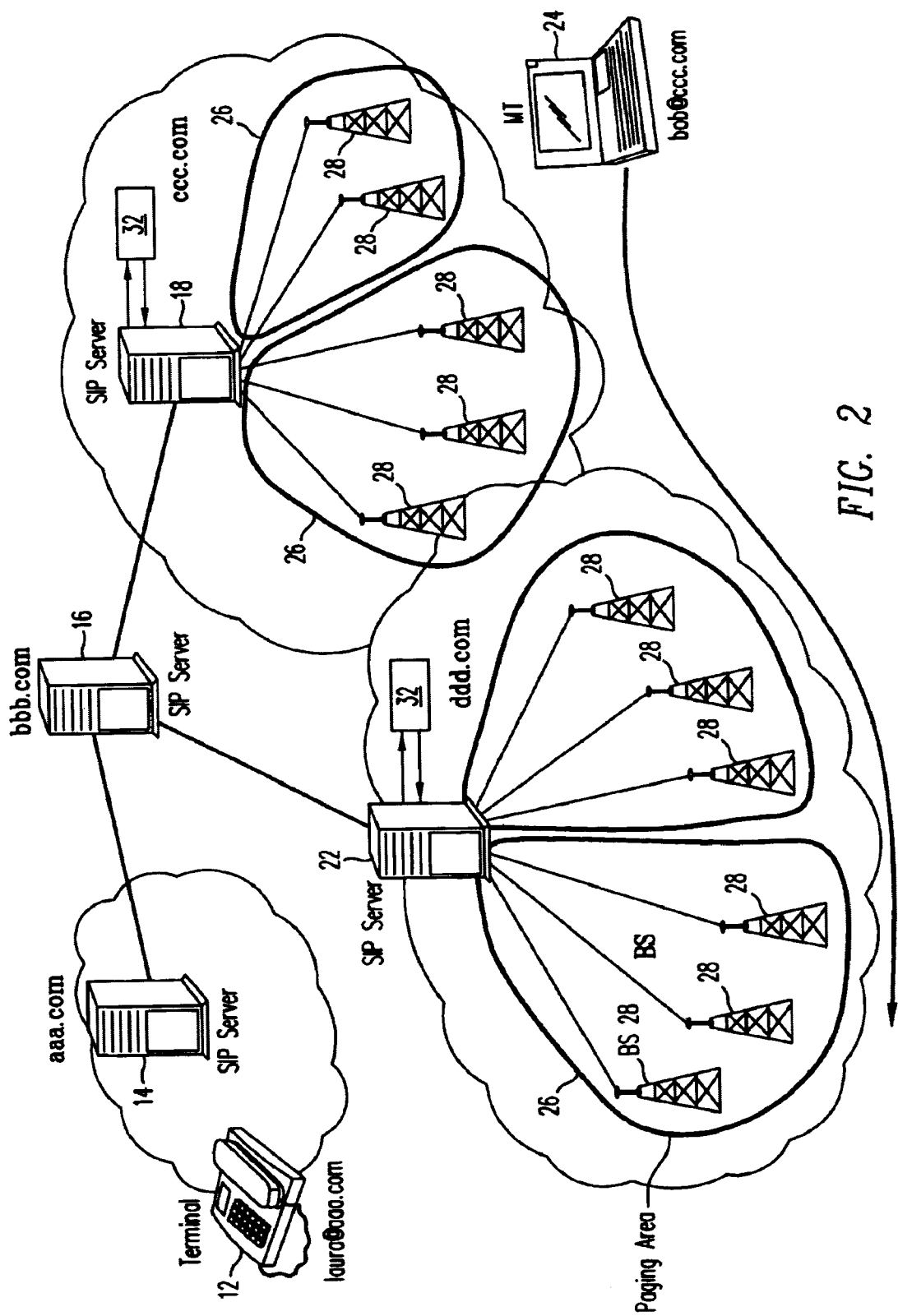
FIG. 2 schematically illustrates known heterogeneous access networks with SIP.

Some of the above SIP concepts are explained below with respect to FIGS. 2–4. In particular, FIG. 2 shows an overview of various heterogeneous access networks with SIP. As shown, the SIP Servers 14, 16, 18, and 22 are, for example, in the domains of aaa.com, bbb.com, ccc.com, and ddd.com, respectively. Mobile terminal 24 in the dormant mode moves from one domain to another.

As indicated by the end point of the arrow in FIG. 2, the mobile terminal 24 with the address of bob@ccc.com is initially registered in the SIP domain of ccc.com by the location server 32 associated with SIP server 18. In this example, the SIP domain ccc.com has two paging areas 26 which are defined by several base stations 28.

When a terminal 12, such as a mobile terminal or a fixed line terminal, having an identification (laura@aaa.com) tries to make a phone call to the mobile terminal 24 in SIP, the caller terminal 12 sends an INVITE request to the SIP server 14 (SIP domain is aaa.com) to which the terminal 12 belongs. Then, the INVITE request is forwarded to the SIP server 18 (ccc.com) to which the mobile terminal 24 belongs. The SIP server 18 then obtains the mobile terminal 24 or callee's location from the SIP location server 32 which is co-located with SIP Server 18 as shown in FIG. 2.

Suppose the mobile terminal 24 moves to another location, such as the domain of ddd.com. In this situation, the mobile terminal 24 always updates its location whenever the SIP domain address is changed by informing the SIP location server 32 of SIP server 22 which is associated with the new SIP domain address, such as bob@ddd.com.

As shown in FIG. 2, the dormant mode mobile terminal 24 moves from the domain "ccc.com" to the domain "ddd.com" without getting a new SIP address. This is because the mobile terminal 24 is in the dormant mode which prevents the SIP from knowing that the mobile terminal 24 has moved from the domain "ccc.com" to the domain "ddd.com". Thus, the INVITE request sent to the dormant mode mobile terminal 24 to bob@ccc.com arrives at the SIP server 18 (ccc.com). Then the SIP server 18 tries to find the mobile terminal 24, but the mobile terminal 24 is out of the domain of the SIP server 18. In accordance with the present invention, the above problem is solved by combining the L2 location update to the SIP location update so that paging will work effectively as will be explained below.

Figure 3:
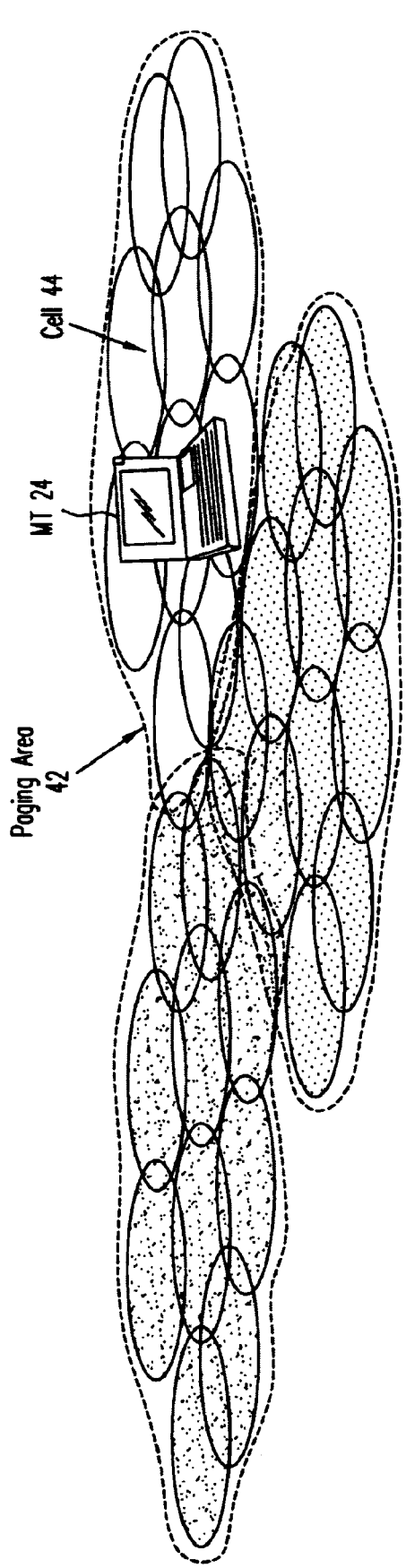
FIG. 3 schematically illustrates a paging area for a mobile terminal in accordance with a known paging scheme.

As shown in FIG. 3, an example of a paging scheme is shown where the current access network associated with the mobile terminal 24 pages the callee mobile terminal 24. The paging and SIP messages are separate issues because the paging is in Layer 2 (L2) and SIP messages are in an application layer. In this case, the INVITE request is transmitted to the current associated access network. Then the current access network pages the mobile terminal 24. After the paging is successful, the current access network forwards the INVITE request to the mobile terminal 24. If the paging is not successful, the non-successful paging message is returned to SIP server 18.

Since the mobile terminal 24 may be able to access various access networks, the efficient paging scheme saves the paging traffic as well as reducing the connection establish time. Since the paging executes in L2 and the SIP works in application layer, the present invention presents a heterogeneous paging scheme which harmonizes both L2 and SIP location update mechanisms.

Figure 4:
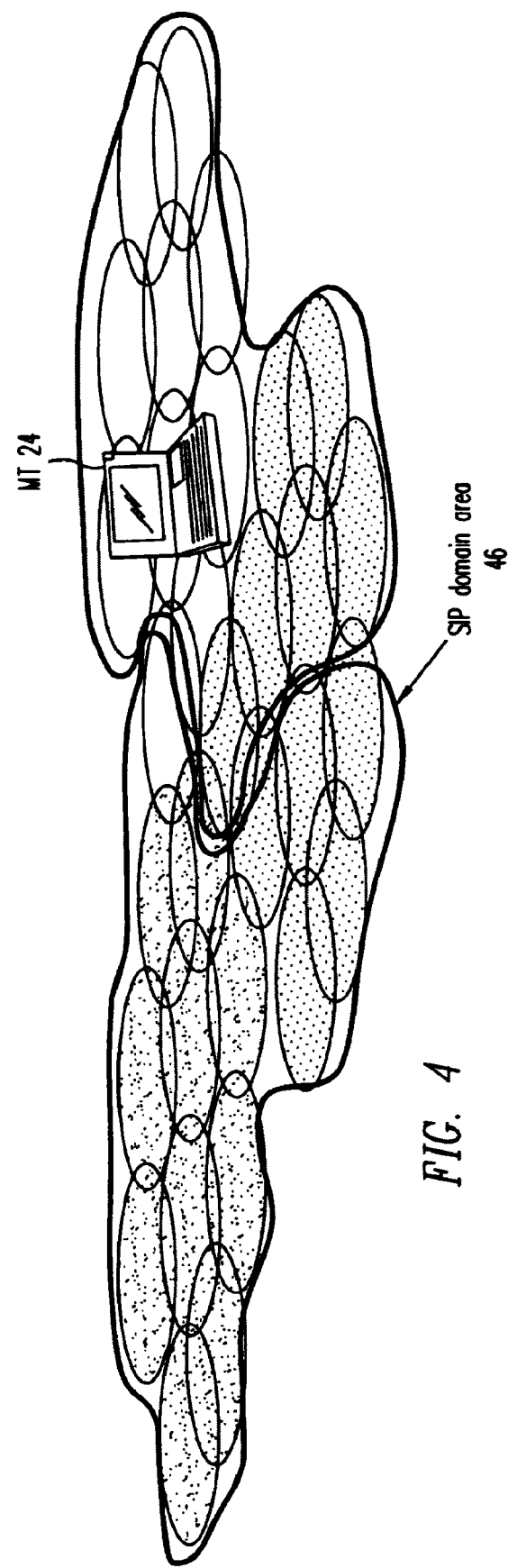
FIG. 4 schematically illustrates an SIP domain area for the mobile terminal that is in the paging area of FIG. 3.

As shown in FIGS. 3 and 4, for a given geographical area the coverage area of the paging location (see three areas denoted by dashed lines in FIG. 3) and the coverage area of the SIP location (see two areas denoted by solid black lines in FIG. 4) are different. The paging area 42 shown in FIG. 3 is designed by the mobile communication system and so it is designed by the L2 issue. The paging area 42 includes several cells 44. On the other hand, the SIP domain areas are designed by the SIP address issue like ccc.com. Therefore, the paging area 42 is not exactly the same as the SIP domain area 46. Due to the fact that areas 42 and 46 do not exactly coincide, whenever the mobile terminal 24 crosses the boundary of the paging area 42 as well as the SIP domain area 46, the mobile terminal 24 needs to send location update messages for the paging area 42 and the SIP domain area 46, respectively. If the Mobile IP is used, it is not necessary to use the location update message for SIP. However, as stated previously, the dormant mode mobile terminal is not able to get a new IP address unless the mobile terminal becomes active. Therefore, when the mobile terminal 24 is in the sleeping or dormant mode, SIP may not reach the callee mobile terminal 24 when the mobile terminal 24 in the sleeping mode crosses the SIP domain area boundary.

Figure 5:
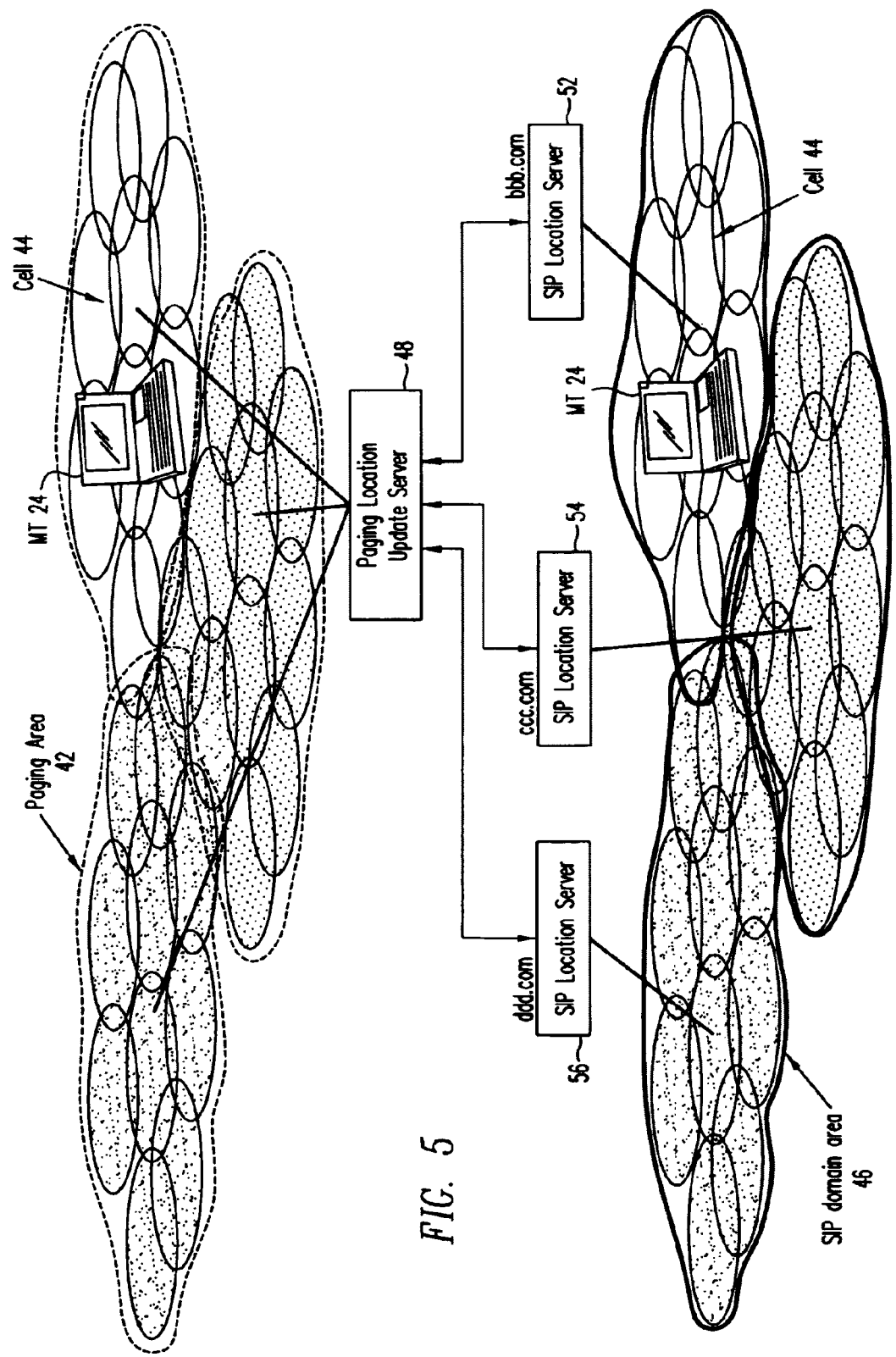
FIG. 5 schematically illustrates an embodiment of a single location update mechanism in accordance with the present invention.

In order to overcome this problem, the present invention contemplates having the operator set up both the paging area 42 and SIP domain area 46 be identical as shown in FIG. 5. In addition, the present invention contemplates a single location update mechanism (especially the paging location update) can be used for both purposes.

In accordance with the present invention, the single location update mechanism is realized by having the paging location update message update the mobile terminal location as well as the SIP domain area. As shown in FIG. 5, the mobile terminal 24 crosses the paging area boundary 42 causing the mobile terminal 24 to send the paging location area update to the paging location update server 48. Then, the paging location update server 48 updates the SIP location server 52 which tracks the location, i.e., SIP domain address, of the mobile terminal 24. Therefore, the mobile terminal 24 does not need to transmit two different location update messages.

As for the location update message from L2 to the SIP location server, the paging location update server 48 will send the location update message of the mobile terminal 24 to the appropriate SIP location server. For instance, the mobile terminal 24 has SIP address bob@bbb.com when the mobile terminal 24 moves into the SIP domain address ccc.com. Then, the paging location update server 24 sends the new location information or the delete location information of the mobile terminal 24 to the SIP location server 52. At the same time, the paging location update server 24 will send the update information of the mobile terminal 24 location to the SIP location server 54. This is because the paging location update server know the current SIP address of the mobile terminal.

Figure 6:
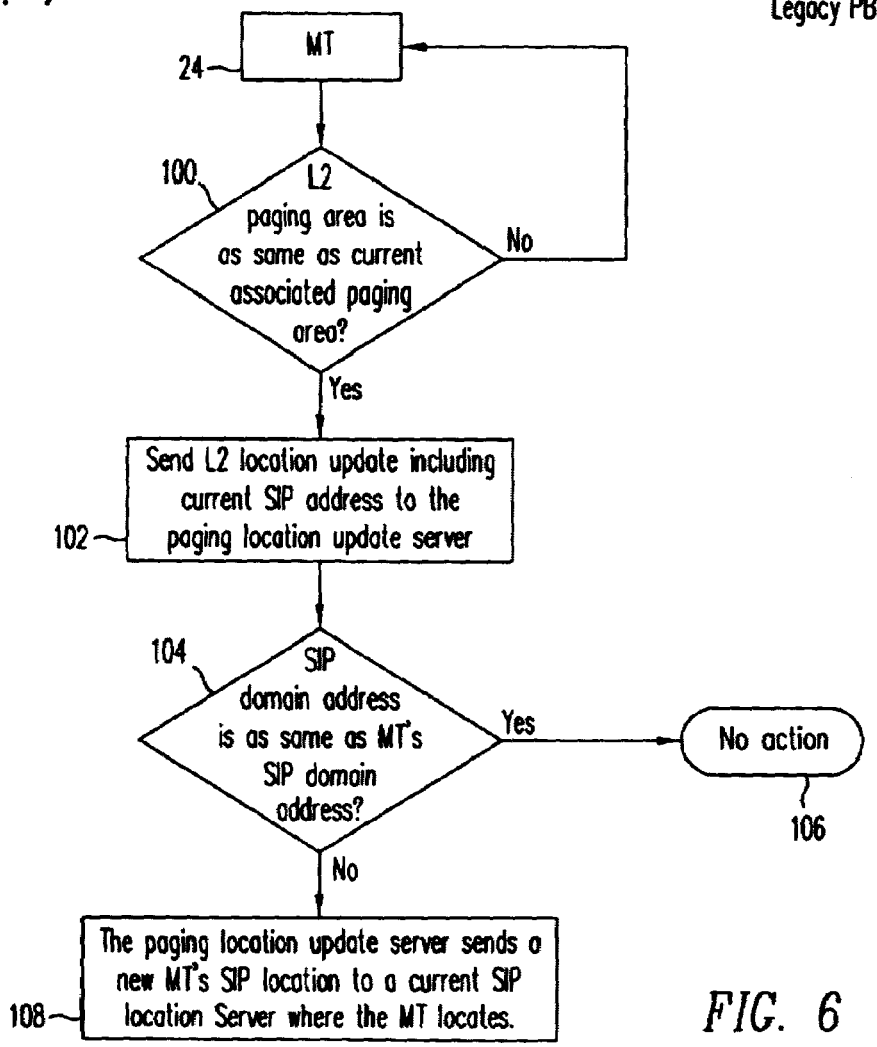
FIG. 6 shows a flow chart of an embodiment of a location updating process in accordance with the present invention.

An example of a location update procedure is shown and summarized in FIG. 6. In particular, the mobile terminal 24 sends a signal to the paging location update server 48 that identifies the location of the L2 paging area from which the signal was sent. The paging location update server 48 determines whether the L2 paging area is the same as the associated paging area to which the mobile terminal 24 is currently being associated or connected per step 100. If the areas are not the same then the process is repeated. If the areas are the same, then the current L2 location update and the current SIP address are sent to the paging location update server 48 per step 102. After the addresses are sent to the server 48, the server 48 determines if the current SIP domain area of the mobile terminal 24 is the same as the SIP domain area of the mobile terminal 24 where the L2 paging area is updated per step 104. If they are the same, then no action is necessary per step 106 since the SIP domain address is not updated. If the SIP domain area is not the same, then the server 48 sends a new SIP location of the mobile terminal 24 to a current SIP location server 62 where the mobile terminal 24 is located per step 108. Then, the current SIP address (e.g. bob@ccc.com) of the mobile terminal shall be updated to a new SIP address (e.g., bob@aaa.com). The paging location update server 48 will transfer a new SIP address obtained from the new SIP server to the old SIP server.

When the caller station 12 makes a call to the mobile terminal 24, the most recent SIP server can handle its INVITE request. After the current associated SIP receives the INVITE request, the L2 paging scheme is used to wake up the mobile terminal 24 from the dormant mode to the active mode.

Figure 7:
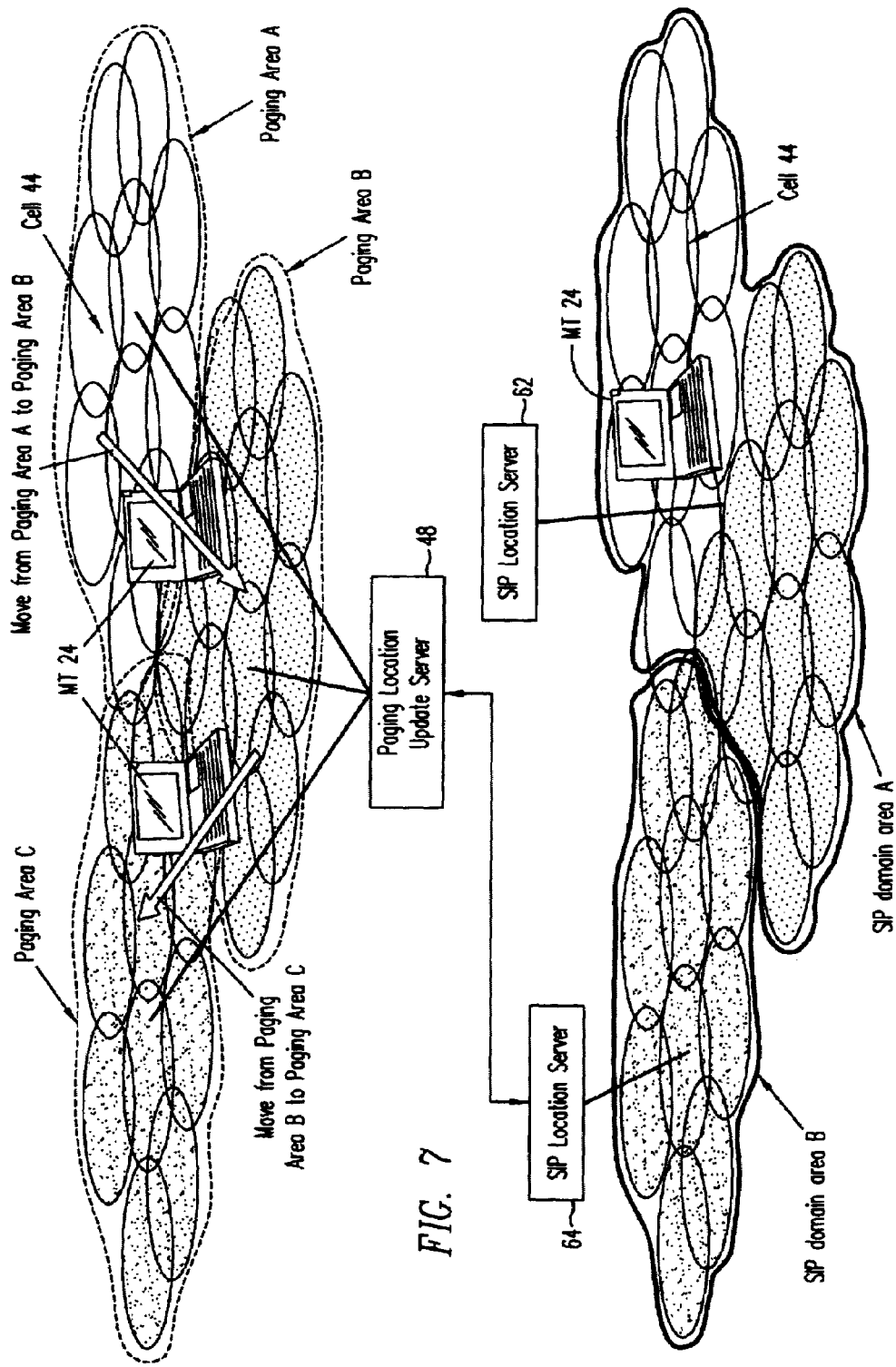
FIG. 7 schematically illustrates a second embodiment of a single location update mechanism in accordance with the present invention.

Another possible scenario is shown in FIG. 7 where the SIP domain area consists of several paging areas. For instance, the SIP location area A overlaps the paging area A and the paging area B. When the mobile terminal 24 moves from the paging area A to the paging area B, the location update message will be transmitted to the paging location update server 48 in L2, but this location update message will not be triggered to the SIP domain update for the SIP location server. On the other hand, the mobile terminal 24 moves from the paging area B to the paging area C, then this location update to the paging location update server 48 will initiate the SIP location update to the SIP location server 64. At the same time, it is possible to send a deleting message of previous mobile terminal's location information in SIP location server 62. While the situation shown in FIG. 5 shows the SIP location area and the paging area not being identical, it should be kept in mind that the SIP location should not be located in the middle of a paging area.

The foregoing description is provided to illustrate the invention, and is not to be construed as a limitation. Numerous additions, substitutions and other changes can be made to the invention without departing from its scope as set forth in the appended claims.

We claim:

1. A method of paging a mobile terminal which moves between paging areas and between domain areas associated with an application layer protocol, the method comprising:
   when said mobile terminal moves from a first paging area to a second paging area, receiving a single message at a location server, said message indicating said mobile terminal to be currently located in said second paging area, and including a current domain area associated with said mobile terminal;
   based on said second paging area, determining whether or not said mobile terminal has moved outside of said current domain area associated with said mobile terminal into a second domain area; and
   updating said location of said mobile terminal to associate said mobile terminal with said second paging area and, when said mobile terminal has moved outside of said current domain area, with said second domain area.

2. The method of claim 1, wherein said application layer protocol is an SIP application layer protocol and said domain area is an SIP domain area.

3. The method of claim 1, wherein a paging area and a domain area covers a substantially identical geographical area.

4. The method of claim 1, wherein a paging area and a domain area do not always cover a substantially identical geographical area.

5. The method of claim 1, wherein said paging areas relate to an L2 protocol.

6. The method of claim 2, wherein said paging areas relate to an L2 protocol.

7. The method of claim 1, wherein said message comprises a paging location area update signal to a paging location update server.

8. The method of claim 1, wherein said mobile terminal is in a dormant mode with respect to said application layer protocol, when said mobile terminal moves to said second paging area.

9. A method of updating a location of a mobile terminal, the method comprising:
   sending a signal from a mobile terminal to a paging location update server;
   identifying a location of an L2 paging area from which said signal was sent from said mobile terminal;
   determining whether said paging area is the same as an associated paging area to which said mobile terminal is currently being associated or connected;
   sending a current location update and a current SIP domain address of said mobile terminal to said paging update location server;
   determining if an SIP domain address of said mobile terminal where it moves to a new paging area is the same as said current SIP domain address of said mobile terminal; and
   sending a new SIP location of said mobile terminal to a current SIP location server where said mobile terminal is located when said SIP domain address of said mobile terminal where it is located in a new paging area is different than said current SIP domain address of said mobile terminal.

10. A location update system for updating a location of a mobile terminal with respect to paging areas and domain areas, said domain areas being associated to an application layer service, said location update system comprising:
   a paging area register that relates said location of said mobile terminal to a paging area;
   a domain area register that relates said location of said mobile terminal to a domain area; and
   a paging location update server that, upon receiving a location update request from a mobile terminal indicating said mobile terminal's current paging area, updates said location of said mobile terminal in said paging area register and said domain area register, in accordance with said current paging area.

11. The location update system of claim 10, wherein said paging areas is L2 based.

12. The location update system of claim 10, wherein said domain area is SIP based.

13. The location update system of claim 11, wherein said domain area is SIP based.

14. The location update system of claim 10, further comprising a location server maintaining said domain area register, wherein said paging location update server sends a message to said location server to update said location of said mobile terminal in said domain area register.

15. The location update system of claim 12, further comprising an SIP location server maintaining said domain area register, wherein said paging location update server sends a message to the SIP location server to update said location of said mobile terminal in said domain area register.

16. A paging location update server having responsibility for registering the locations of mobile devices in a paging area, comprising:
   an L2 paging protocol handler for receiving a location update request from a mobile device coming into the paging area; and
   an application layer protocol handler for communicating with a location server associated with an application layer service, wherein when the L2 paging protocol handler receives the location update requests, the L2 paging protocol handler causes the application layer protocol handler to provide the location server associated with the application layer service with the location of the mobile device.

17. A paging location update server as in claim 16, wherein the application layer service uses the Session Initiation Protocol (SIP).

18. A paging location update server as in claim 16, wherein the application layer service relates the mobile device to a domain area.

19. A paging location update server as in claim 18, wherein the domain area geographically coincides with the paging area.

20. A paging location update server as in claim 18, wherein the location server associated with the application layer service is provided the location of the mobile device irrespective of whether or not the mobile device is in a dormant mode of operation.

* * * * *